(12) United States Patent  
Kalemba et al.

(10) Patent No.: US 7,427,196 B2
(45) Date of Patent: Sep. 23, 2008

(54) APPARATUS FOR EXERCISING A LIVE HINGE

(75) Inventors: Jacek Kalemba, Oakville (CA); Muhammad Zeeshan Anwar, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 768 days.

(21) Appl. No.: 11/033,222

(22) Filed: Jan. 11, 2005

(65) Prior Publication Data

US 2006/0151909 A1 Jul. 13, 2006

(51) Int. Cl.
 B29C 45/56 (2006.01)
 B29C 53/02 (2006.01)
 B29C 45/04 (2006.01)
 B29C 45/40 (2006.01)
 B29C 53/00 (2006.01)

(52) U.S. Cl. .................. 425/517; 425/441; 425/317; 425/577

(58) Field of Classification Search .................. 425/567, 425/441, 517, 556, 436 R, 317, 577, DIG. 58, 425/DIG. 3; 264/205
See application file for complete search history.

(56) References Cited

U.S. PATENT DOCUMENTS

| | | | |
|---|---|---|---|
| 4,340,352 A | 7/1982 | Hayberg | |
| 4,351,630 A | 9/1982 | Hayberg et al. | |
| 4,818,208 A | 4/1989 | Byrne | |
| 4,897,032 A | 1/1990 | Corteggiani | |
| 5,744,082 A | 4/1998 | Bak | |
| 6,820,721 B1 | 12/2004 | Martin | |
| 2004/0052891 A1 | 3/2004 | Kalemba | |

FOREIGN PATENT DOCUMENTS

| | | |
|---|---|---|
| EP | 1512513 | 9/2005 |
| JP | 56020689 | 8/1982 |
| WO | WO 02/28622 A1 | 4/2002 |

OTHER PUBLICATIONS

International Search Report for PCT/CA2005/001835, dated Feb. 23, 2006, three pages, related to the above-identified US patent application.

*Primary Examiner*—Sam Chuan Yao
*Assistant Examiner*—Robert J Grun (57) ABSTRACT

The present invention provides a device for exercising a live hinge formed integrally between a vessel portion and a lid of an article during injection molding. In an embodiment, the device includes a core block for forming the vessel portion and a movable side core for forming the lid. The side core has a molding position for forming the article, and an ejection position for ejecting the article from the core block. The device also includes an exercising member that is movable with the side core. The exercising member closes the lid and exercises the hinge during travel from the molding position to the ejection position.

24 Claims, 9 Drawing Sheets

APPARATUS FOR EXERCISING A LIVE HINGE

FIELD OF THE INVENTION

The present invention relates generally to injection molding and particularly relates to an apparatus for performing an action on a just-molded injection molded article that is still partially resident within an injection mold, more particularly the action is an exercising of a live hinge on the injected molded article.

BACKGROUND OF THE INVENTION

In an injected molded article, a live hinge is a single flexible part molded integrally with two components, so that pivoting can occur between the components along the live hinge. A live hinge can be an elegant and relatively simple way to provide a hinged article. When molding an article with a live hinge, it is common to exercise the hinge before it cools after the molding process, thereby providing flexibility and free movement of the live hinge.

It is known to provide live hinges between a vessel and a lid of an injected molded articles, so that the lid will seal the vessel and thereby provide a closed container. Exercising the hinge shortly after injection in order to close the lid can be particularly desirable for such closed containers, in order to reduce problems that can arise from non-uniform shrinkage of the injected materials during cooling, which can lead to an improper fit between the lid and vessel. Closing the lid of the molded container can allow the lid and vessel to cool and shrink together and thereby form a proper fit.

Devices for exercising live hinges of molded articles while in the mold are known. U.S. Pat. No. 4,351,630 to Hayberg, issued Jul. 20, 1982, describes various devices for exercising a live hinge, the contents which is incorporated herein by reference. One such device is described by way of the background in Hayberg. This device uses compressed air and pistons to move pins that initially push the lid away from the molding surface to exercise the live hinge. However, such air pistons are not always effective in exercising or closing smaller lids with smaller surface areas.

The use of such an in-mold lid closing device obviates many of the costs and challenges associated with the alternative of providing a post-molding system for re-orienting the molded articles, as required, and subsequently effecting a closing of the lids. For example, where the molded article is configured to provide the function of at least a portion of an aseptic container the additional handling and manipulation steps effected by the post-molding system may undesirably increase the risk of contaminating the molded article.

Hayberg also discloses a device for exercising a live hinge and closing a lid while in the mold, by the action of a finger engaging with the lid. There are however, several disadvantages with Hayberg wherein the lid closing device, along with a dedicated actuator therefore, is arranged at the periphery of the mold. For example, the device cannot be readily used with an injection mold that includes a laterally actuated side core (side cores are known for use in molding features on the molded article that are at a substantial angle with respect to the draw of the mold, such as an integrally formed lid that is formed at an acute angle to a base portion, or a live hinge that is configured between the sides of the molded article) that may interfere with the proper transit of the lid closing device that must enter from the periphery of the mold. In addition, the device also has a large physical space requirement that may limit the productivity of the tool (i.e. lower mold cavitation). Furthermore, the device introduces additional cost and control complexities associated with the need for a dedicated actuator and for sequence coordination between the steps of operating the device with those of the mold. Additionally, Hayberg discloses how to exercise live hinges where the hinge is located on the periphery of the vessel (or other base portion), but does not disclose formation of articles where the live hinge is located elsewhere on the vessel.

SUMMARY OF THE INVENTION

In accordance with an embodiment of the present invention, a novel apparatus is provided for exercising a live hinge that advantageously obviates or mitigates at least one of the above-identified disadvantages of the prior art.

The novel apparatus may also be advantageously configured for performing other actions on the just-molded injection molded article.

In accordance with a first aspect of the present invention, an improved mold slide assembly is provided. The slide assembly includes a slide laterally moveable in relation to a first core portion between a molding position and an ejection position, and a second core portion attached to the slide. The first and second core portions cooperative with complementary cavity portions in the molding position to form respective first and second parts of an article having a live hinge integrally formed between the parts. The slide assembly also including an exercising member movably connected to the slide, the exercising member for moving the second part to exercise the hinge while the slide moves from the molding position into the ejection position.

In accordance with another aspect of the present invention, an exercising member for exercising a live hinge formed integrally between a first portion and a second portion of an article during injection molding is provided. The first portion being molded using a first core portion and a cavity portion, the second portion being molded using a movable second core portion and the cavity portion, the second core portion movable from a molding position to an ejection position. The exercising member comprising an attachment movable with the second core portion, and an engagement member connected to the attachment for moving the second portion and exercise the hinge during movement from the molding position into the ejection position.

In accordance with yet another aspect of the present invention, a mold for molding an article is provided having a first part and a second part and a live hinge integrally formed therebetween. The mold comprising a first core portion, a slide laterally moveable in relation to the first core portion between a molding position and an ejection position, a second core portion movably connected to the slide, a cavity block having an injection nozzle receptacle; the cavity block movable to engage the injection nozzle receptacle with the core portions in the molding position for an injection of a material into a space defined between the core portions and cavity block to form the article within the space; the cavity block movable away from the assembly after the injection and prior to the slide moving into the ejection position, and, an exercising member movably connected to the slide; the exercising member for moving the second part to exercise the hinge while the slide moves from the molding position into the ejection position.

In accordance with a further aspect of the present invention, a device for performing an action on a just-molded injection molded article is provided that is at least partially retained on a first core portion or on a cavity portion of an injection mold, the mold including at least one movable second core portion. The device comprising a follower movable with the at least one second core portion; the follower for changing the article while the at least one second core portion moves into an ejection position.

In accordance with yet a further aspect of the present invention, a method for exercising a live hinge formed integrally between a first portion and a second portion of an article during injection molding is provided. The method comprising the steps of: in a molding position, forming the first portion in a first core portion while forming the second portion in a movable second core portion, and, moving the second core portion from the molding position to an ejection position while exercising the live hinge with an exercising member movable with the second core portion.

BRIEF DESCRIPTION OF THE DRAWINGS

The present invention will now be explained, by way of example only, with reference to certain embodiments and the attached figures in which.

DETAILED DESCRIPTION OF THE INVENTION

Figure 1:
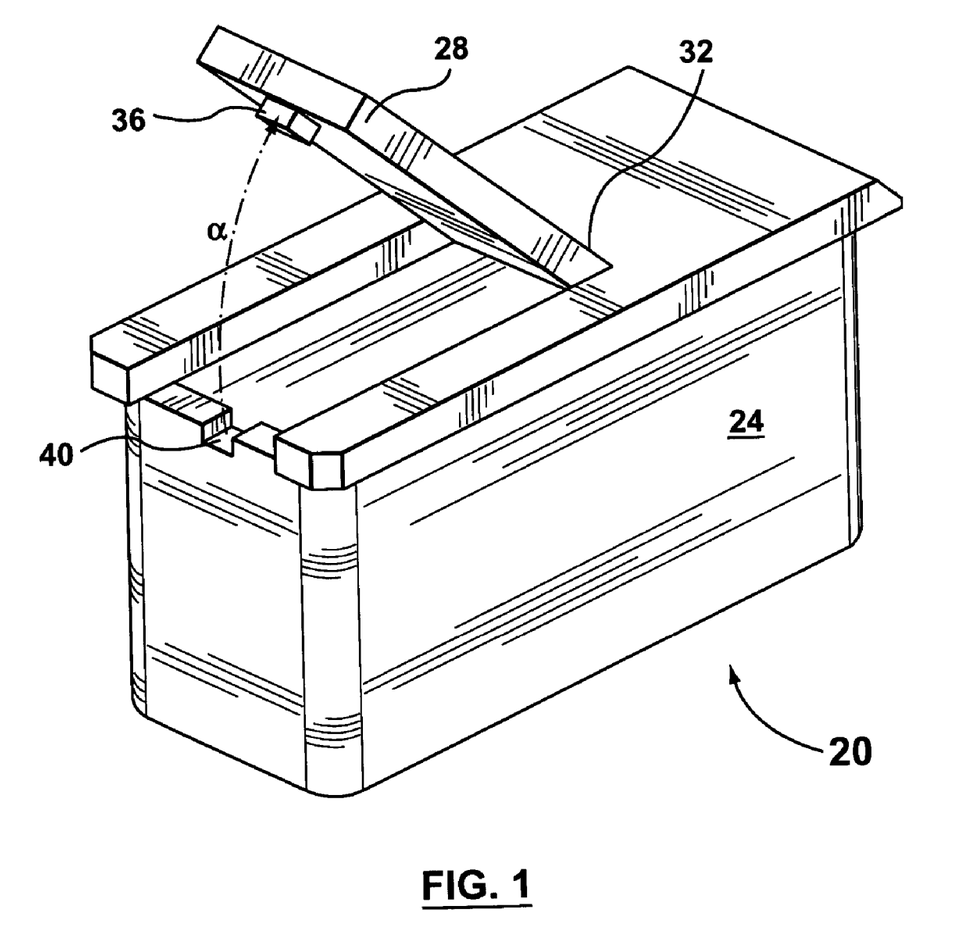
FIG. 1 is a perspective view of a container formed in accordance with an embodiment of the invention.

Referring to FIG. 1, an embodiment of the invention includes a molded article in the form of a container closure 20 for use in closing an end of a container (not shown). Container closure 20 includes a vessel portion 24, a lid 28 for selectively covering or uncovering vessel portion 24, and a live hinge 32 formed integrally between vessel portion 24 and lid 28. In addition, container closure 20 includes a tab 36 attached to lid 28, and a slot 40 attached to vessel portion 24, wherein tab 36 is adapted to fit into slot 40 to latch lid 28 to vessel portion 24 when closed. Container closure 20 is made from any suitable material, such as plastic used for injection molding. In FIG. 1, lid 28 is shown in an open position, the angle of the opening being indicated at α (shown in dotted Lines), which in an present embodiment is an acute angle less than about ninety degrees.

To use container closure 20 after formation, lid 28 can be closed from the open position by pivoting lid 28 towards vessel portion 24 and depressing lid 28 so that tab 36 fits within slot 40 to latch lid 28 in the closed position, pivoting about live hinge 32. By the same token lid 28 can be opened from the closed position by urging lid 28 away from vessel portion 24 and pivoting lid 28 so that the interior of vessel portion 24 is accessible.

As will become apparent from the teachings herein, container closure 20 is simply one example of an article that can be formed in accordance with the present invention. Indeed the teachings herein can be applicable to any article having a live hinge (such as hinge 32) formed integrally between a first part (such as vessel portion 24) and a second part (such as lid 28) of the article.

Figure 2:
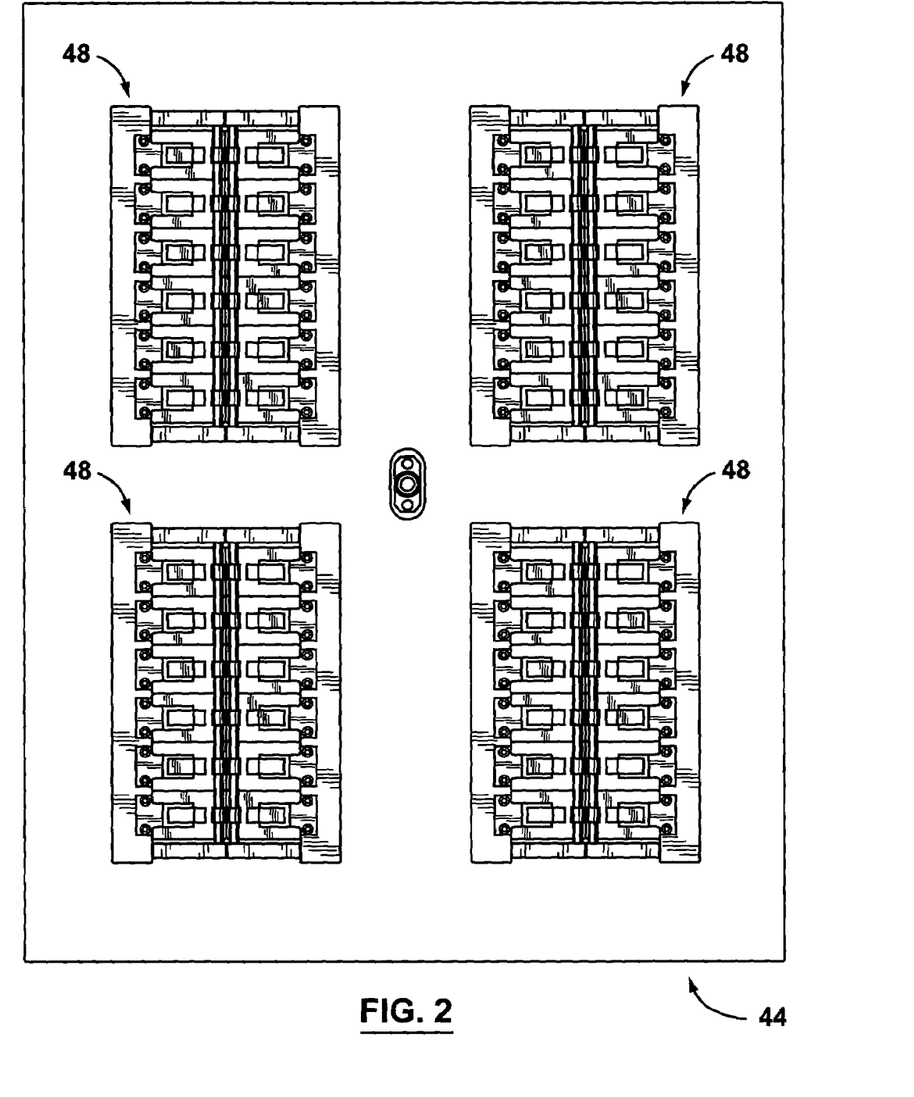
FIG. 2 is a plan view of a core-plate assembly in accordance with an embodiment of the invention.

Referring to FIG. 2, an embodiment of the invention includes core plate assembly 44. Core plate assembly 44 includes four slide-core assemblies 48 for forming a plurality of containers 20 and exercising each live hinge 32 respective to each container closure 20.

Figure 3:
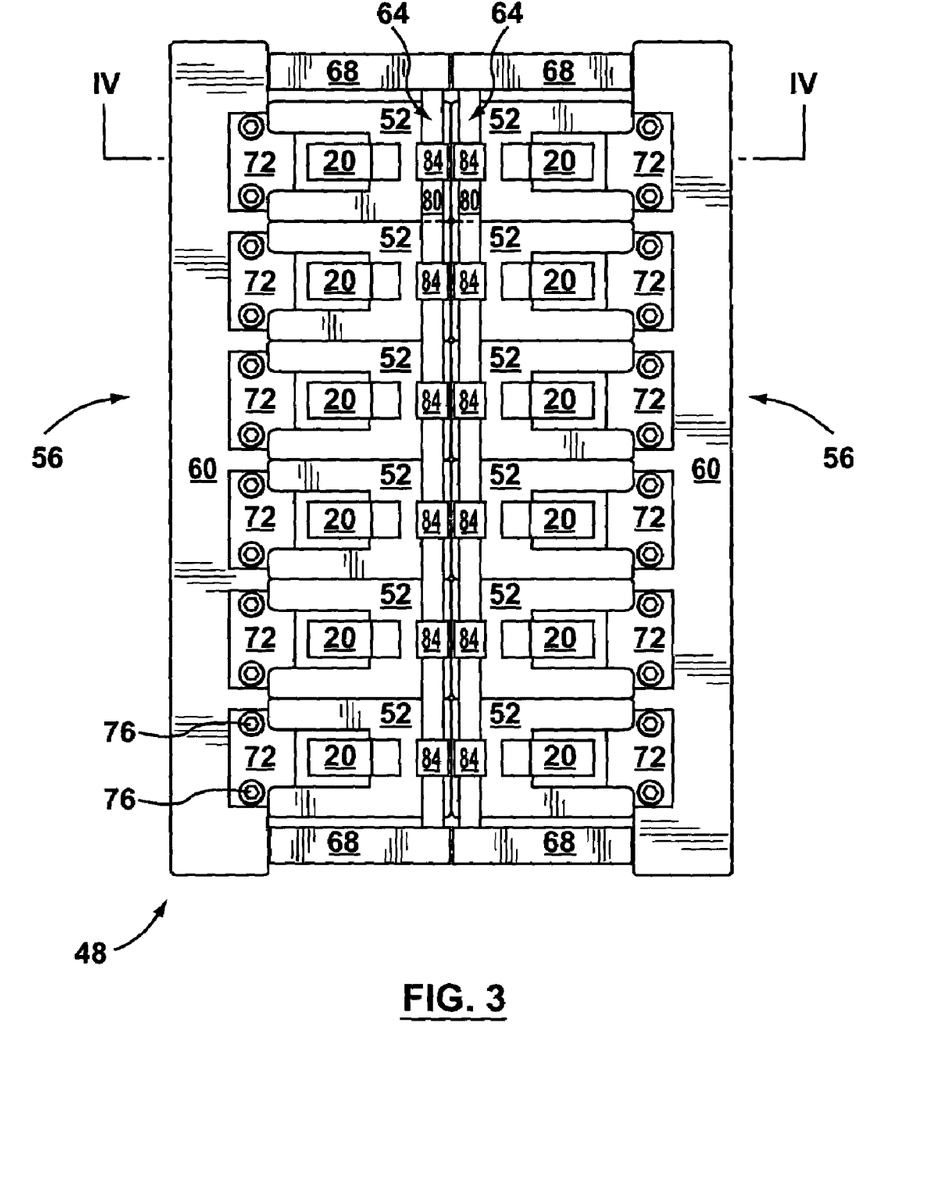
FIG. 3 is a plan enlarged view of a slide-core assembly from the core-plate assembly of FIG. 2.

Referring to FIG. 3, one slide-core assembly 48 from core plate assembly 44 is shown in greater detail. Slide-core assembly 48 includes twelve core blocks 52 and a pair of slide assemblies 56. As will be explained in greater detail below, slide-core assembly 48 is shown in a molding position, with a plurality of containers 20 having just been formed. Thus, in FIG. 3, a container closure 20 is shown disposed within each core block 52.

Each slide assembly 56 includes a slide 60 connected to an exercising member 64 via a pair of connecting rods 68 located at opposite ends of each slide assembly 56. Slide assembly 56 also includes six side cores 72 that are each bolted to slide 60 with a pair of bolts 76; with one side core 72 respective to each core block 52.

Exercising member 64 includes a cylindrical roller shaft 80 rotatably attached between the distal ends of each connecting rod 68. Roller shaft 80 includes six cylindrical rollers 84 mounted thereto, with one roller 84 positioned respective to each core block 52.

Figure 4:
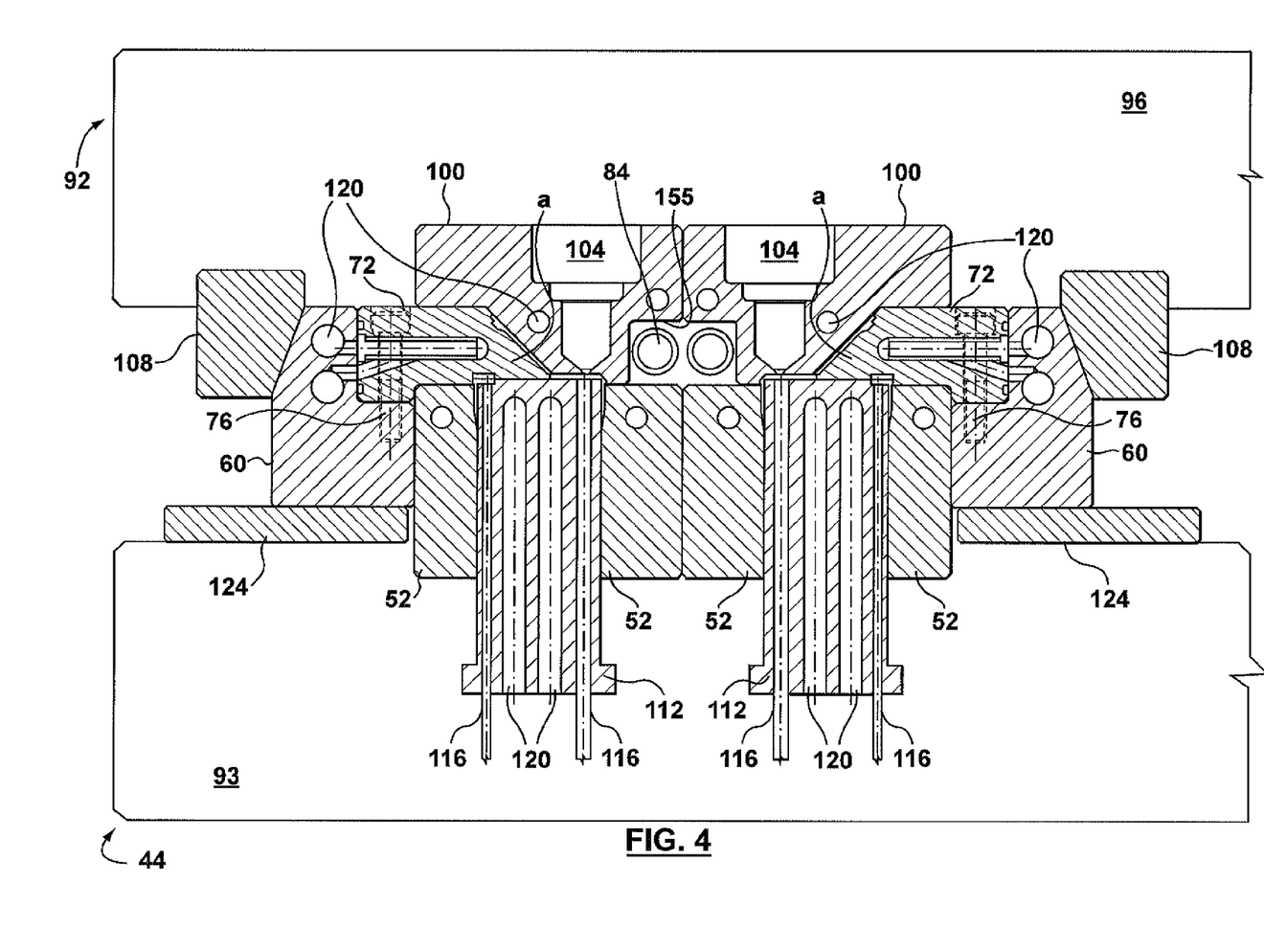
FIG. 4 is a mold section through the dotted line labeled as IV-IV in FIG. 3 that shows a slide-core assembly in a molding position.

FIG. 4 shows a mold section which is derived from a sectional view through the dotted line labeled as IV-IV in FIG. 3 of slide-core assembly 48. Mold section includes a cavity plate assembly 92 (which is not shown in the previous Figures) which engages the core plate assembly 44 during molding while slide-core assembly 48 is in the molding position.

Cavity plate assembly 92 includes a cavity plate 96 that houses cavity blocks 100, each cavity block 100 including an injection nozzle receptacle 104. In FIG. 4, each injection nozzle receptacle 104 is arranged to position an injection nozzle (not shown in FIG. 4)) for the delivery of molten plastic into a molding cavity for formation of container closure 20. The molding cavity is defined between a set of molding surfaces that are disposed on the core block 52, side core 72, cavity block 100, and on an inner core 112, when they are arranged in a molding configuration. The cavity plate assembly 92 is also shown to include a pair of closing wedges 108 respective to each slide 60, such that when cavity plate assembly 92 engages core plate assembly 44, closing wedges 108 retain side core 72 against cavity block 100 and thereby retain the integrity of the molding cavity portion that defines lid 28 during its formation. (It is to be understood, however, that cavity plate assembly 92 in other embodiments need not include closing wedges 108.)

Mold section 88 also includes the inner core 112, introduced hereinbefore, that is positioned within the core block 52, to define a hollow portion of the vessel portion 24 of the container closure 20. Each core block 52 also includes a pair of ejector pins 116 positioned within inner core 112. Ejector pins 116 have a retracted position (as shown in FIG. 4) when in the molding position, and an extended position (not shown in the Figures) for urging a formed container closure 20 out of core block 52 when slide-core assembly 48 is in an ejection position (discussed in detail below). (While this embodiment contemplates a pair of ejector pins 116, it is to be understood that any type of ejection mechanism, and/or any number of desired ejector pins 116 can be used to effect ejection).

Mold section 88 also includes coolant passages 120 positioned within core block 52, slide 60, cavity block 100, and inner core 112, (of which only a few are indicated in FIG. 4). Passages 120 carry coolant to lower the temperature of the respective portions of mold section 88 during injection molding. (However, it is to be understood that mold section 88 can include any type and/or any number of desired coolant passages 120, (or even none) as appropriate or otherwise desired.)

As shown in FIG. 4, slides 60 are moveably mounted on wear plates 124, which in turn are affixed to a front face of a core plate 93 of the core plate assembly 44, thereby providing a bearing surface along which slides 60 can travel.

In the molding position, slide 60 abuts core block 52, and side core 72 is positioned above the distal portion of core block 52 and inner core 112. Cavity block 100 is positioned adjacent to side core 72 and above the distal portion of core block 52 and inner core 112. The molding surfaces on the cavity block 100 and side core 72, respectively, mate and cooperate to provide the cavity portion that defines the lid 28 during its formation. Similarly, the molding surfaces on the cavity block 100, the core block 52, and the inner core 112 mate and cooperate to provide a cavity portion that defines the vessel portion 24 during its formation.

Also in the molding position, the roller 84 is positioned above the proximal portion of core block 52, in a pocket 155 in the cavity block 100 and opposite from side core 72, thereby keeping roller 84 out of the path of injection nozzle receptacle 104 and the cavity that defines container closure 20 during the formation of container closure 20.

Figure 5:
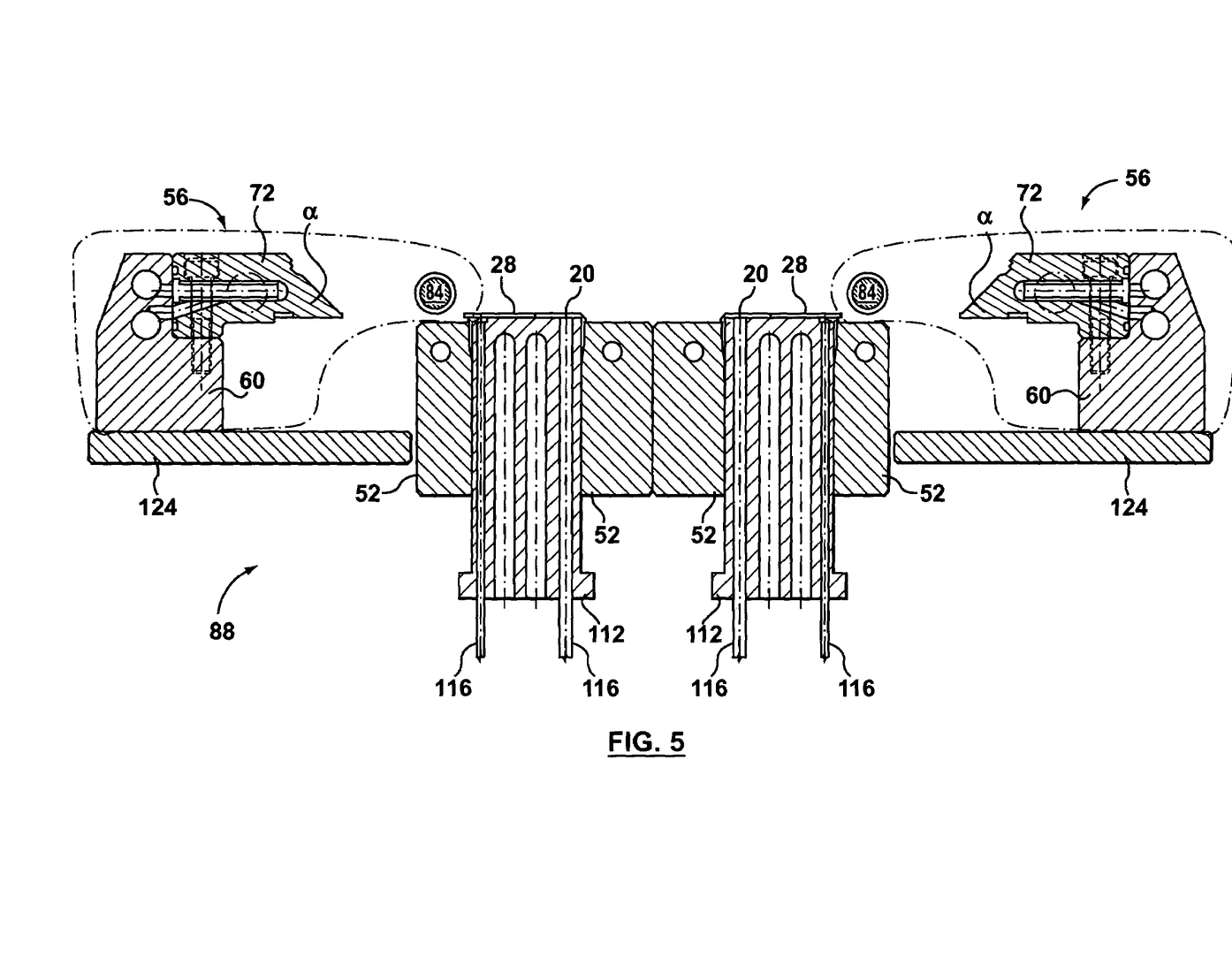
FIG. 5 is the sectional view of FIG. 4 wherein the slide-core assembly is in an; ejection position.

While FIG. 4 shows a section of slide-core assembly 48 in a molding position, slide-core assembly 48 also has an ejection position. Referring now to FIG. 5, mold section 88 is shown with slide assembly 56 (shown in dotted lines) in the ejection position. Cavity plate assembly 92 has been moved away from side core 72 and core block 52, thereby allowing slide assembly 56 to freely travel along wear plate 124 and exposing container closure 20 for ejection. Slide 60 and side core 72 are positioned on the distal portion of wear plate 124 and away from core block 52. Roller 84 is now positioned above the distal portion of core block 52, thereby keeping the roller 84 out of the path of the container closure 20 for ejection thereof. Having so exposed container closure 20, ejector pins 116 (shown in FIG. 5 in the retracted position) are now moveable to an extended position to eject the now-formed container closure 20 out of core block 52.

As will be explained in greater detail below, in FIG. 5, lid 28 is shown in the closed position, having been closed by roller 84 during exercise of hinge 32 as slide assembly 56 traveled from the molding position to the ejection position.

Figure 6:
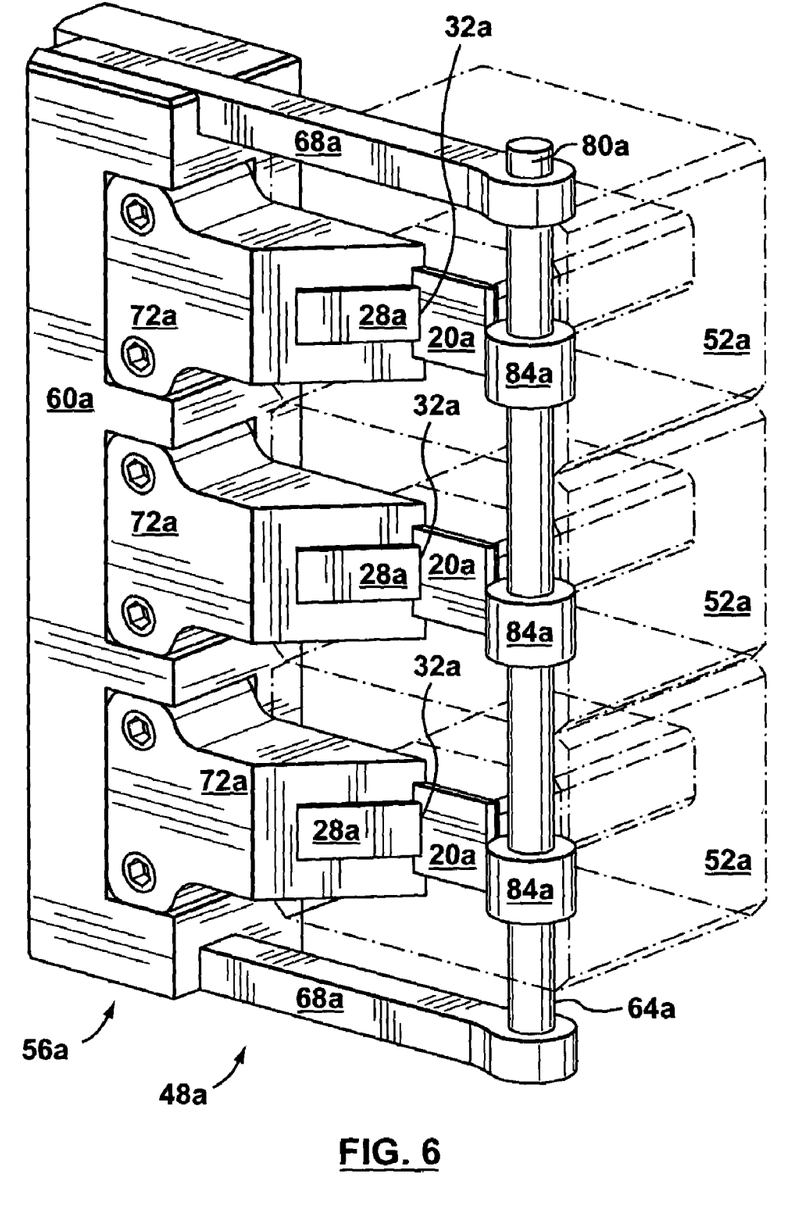
FIG. 6 is a perspective view of a slide-core assembly according to another embodiment of the invention, showing the slide-core assembly in the molding position.
Figure 7:
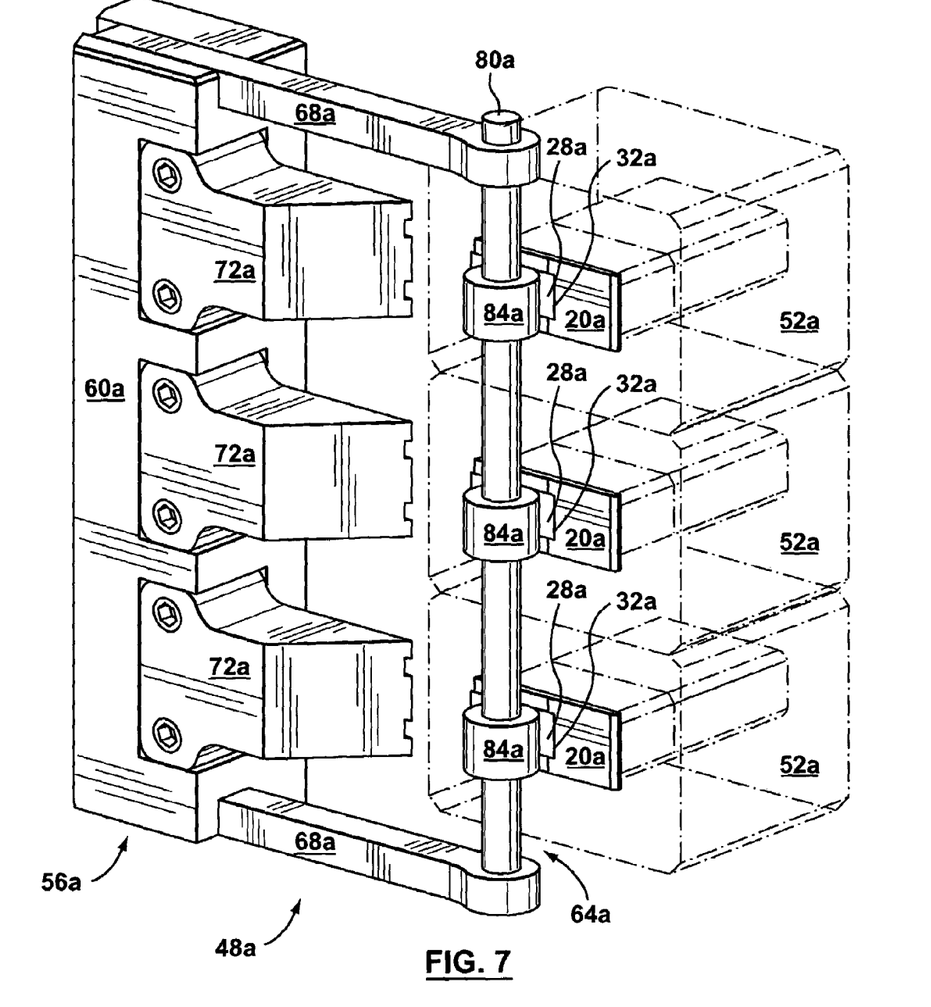
FIG. 7 is the slide-core assembly of FIG. 6 approaching the ejection position.
Figure 8:
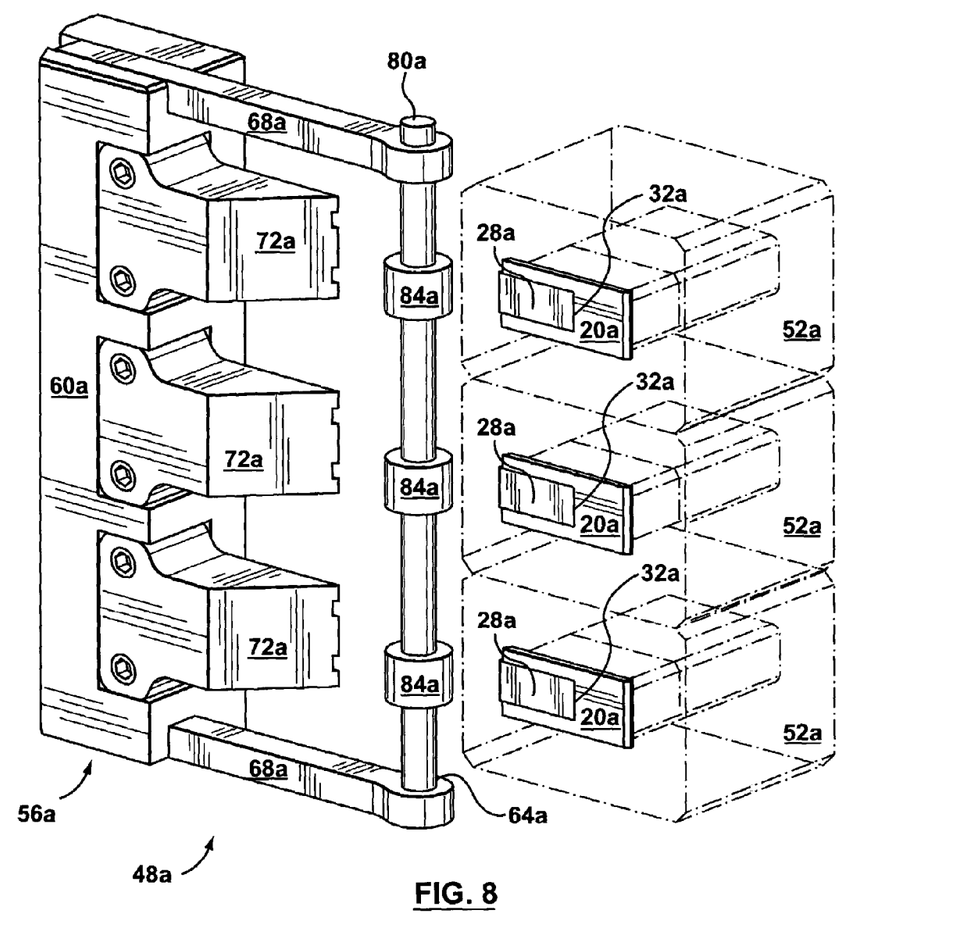
FIG. 8 is the slide-core assembly of FIG. 7 in the ejection position.

A modified version of slide-core assembly 48 is illustrated in FIGS. 6-8, which is indicated generally at 48a. Slide-core assembly 48a includes the same elements as slide-core assembly 48, and like elements in slide-core assembly 48a bear the same reference as their counterparts in slide-core assembly 48, except followed with the suffix "a".

Of notable exception, however, is that in slide-core assembly 48a there are only three side-cores 72a between each pair of connecting rods 68a, in contrast to slide-core assembly 48 where there are six side-cores 72 between each pair of connecting rods 68.

In FIG. 6, slide-core assembly 48a is shown in the molding position, with containers 20a having been formed and the cavity plate (not shown) retracted away from slide-core assembly 48a. Thus, the molding position in FIG. 6 is analogous to the molding position in FIG. 4, except that in FIG. 4 cavity plate assembly 92 is still shown in engagement with slide-core assembly 48.

In operation, and referring first to FIG. 6, once the cavity plate is retracted away from slide-core assembly 48a, slide assembly 56a is now free to travel distally away from core blocks 52a. As slide assembly 56a moves distally away from core block 52a, slide 60a moves laterally towards the distal end of the wear plate. (The wear plate is not shown in FIG. 6, but is substantially the same as wear plate 124 shown in FIGS. 4 and 5). At the initial stages of such movement, side cores 72a retract from lids 28a, thereby leaving lids 28a freely standing in open position. At the same time that slide 60a and side cores 72a move toward the distal end of the wear plate, exercising member 64a follows accordingly, retracting from the proximal portion of core blocks 52a, moving over the first half of containers 20a, approaching lids 28a.

Referring next to FIG. 7, as slide assembly 56a continues to move distally away from core block 52a, rollers 84a engage lids 28a and move lids 28a such that lids 28a pivot about hinge 32a. At the same time as when rollers 84a move lids 28a, rollers 84a also exercise live hinge 32a.

Still referring to FIG. 7, as rollers 84a continue to move lid 28a and exercise live hinge 32a, rollers 84a roll across lids 28a, and depress lids 28a until lids 28a reach a closed position. As rollers 84a depress lids 28a into the closed position, tabs 36 of lids 28a engage with slots 40 of vessel portion 24a to latch each lid 28a to its respective vessel portion 24a.

Next, as shown in FIG. 8, as slide assembly 56a continues to move distally away from core blocks 52a, slide-core assembly 48a moves into the ejection position where slide 60a and side cores 72a are retracted distally away from core blocks 52a, and exercising member 64a is positioned out of the path of containers 20a. Formed containers 20a are now free to be ejected from slide-core assembly 48a. Ejectors pins (not shown in FIG. 8), positioned within the inner core of core blocks 52a, then move from their retracted position to their extended position, thereby urging the formed containers 20a out of core blocks 52a. It will now be apparent to those of skill in the art that the ejection position in FIG. 8 is substantially the same as the ejection position previously discussed in relation to FIG. 5.

It will be apparent that slide-core assemblies 48 and 48a described herein are simply a few examples of assemblies that can be used in accordance with the teachings herein. Indeed the teachings herein can be applicable to any assembly for forming a molded article having at least two portions and a live hinge, and for exercising the live hinge; the assembly including a first core portion (such as core block 52 and inner core 112) for forming a first portion of the molded article (such as vessel portion 24), and a moveable slide (such as slide 60) attached to a second core portion (such as side core 72) for forming a second portion of the molded article (such as lid 28), and an exercising member (such as exercising member 64) for exercising a live hinge (such as hinge 32) of the molded article; the second core portion and exercising member being moveable with the slide.

Figure 9:
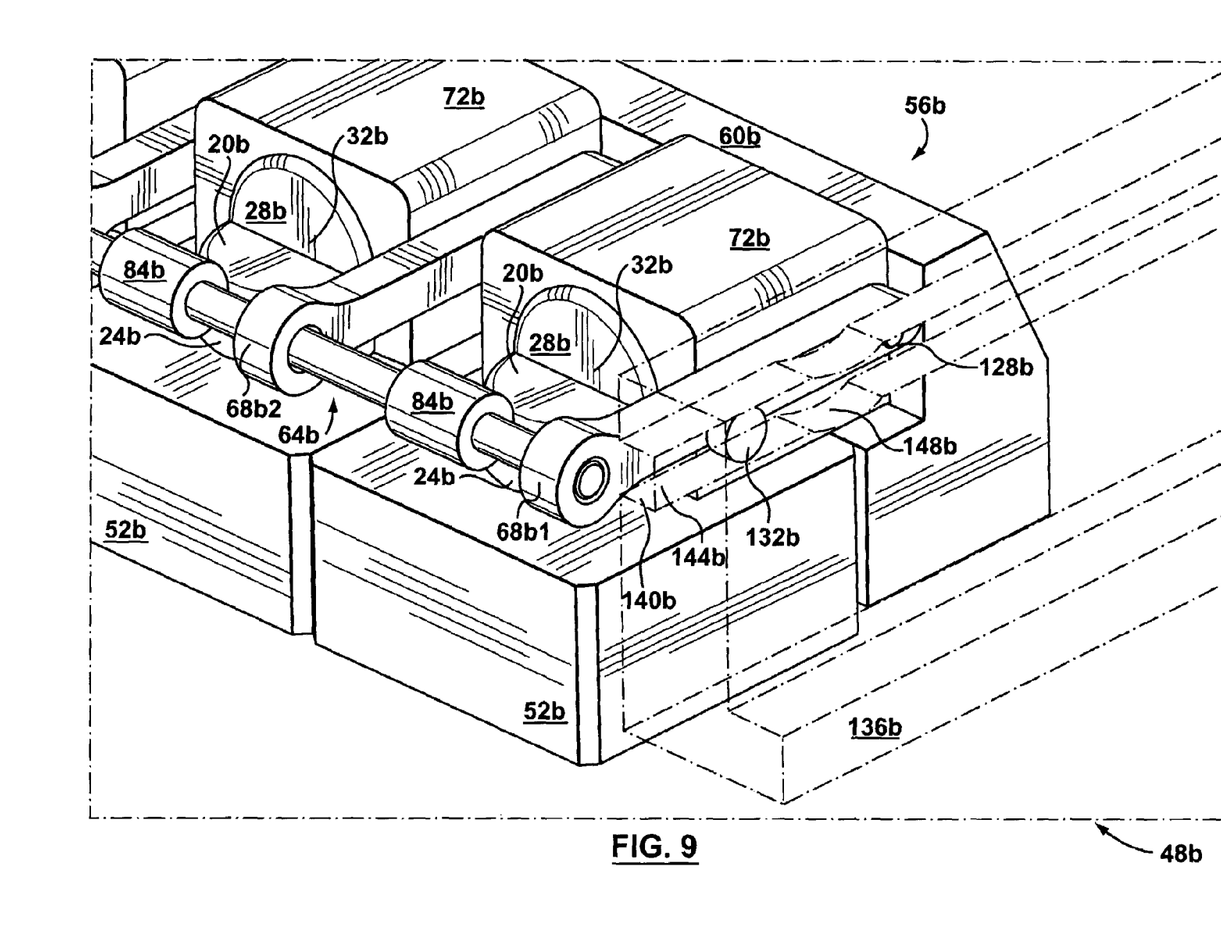
FIG. 9 is a perspective view of a slide-core assembly according to another embodiment of the invention.

Another modified version of slide-core assembly 48 is shown in FIG. 9, which is indicated generally at 48b. Slide-core assembly 48b includes substantially the same elements as slide-core assembly 48, and like elements in slide-core assembly 48b bear the same reference as their counterparts in slide-core assembly 48, except followed with the suffix "b".

Of notable exception, however, is that in slide-core assembly 48b, connecting rods 68b are provided at each end of slide-core assembly 48b, (referred to herein as outer connecting rod and indicated at 68b1 in FIG. 9) and provided between each core block 52*b* (referred to herein as an inner connecting rod and indicated at 68*b*2 in FIG. 9). (Where the context requires, connecting rods 68*b*1 and 68*b*2 are collectively referred to as connecting rods 68*b*, and generically as connecting rod 68*b*.) Connecting rods 68*b* are pivotably connected to respective adjacent side-cores 72*b*, in contrast to slide-core assembly 48 where connecting rods 68 are affixed to slide 60. To achieve the pivotal connection, each side core 72*b* includes a pin 128*b* that is affixed towards the end of side core 72*b* that is closest to slide 60*b*. Each pin 128*b* projects from a side core 72*b* towards its respective connecting rod 68*b*, to provide a pivot about which such connecting rod 68*b* can rotate within a bearing sleeve thereon that receives pin 128*b*.

Outer connecting rods 68*b*1 include cam followers 132*b* projecting from the outer sides of outer connecting rods 68*b*1.

Further, slide-core assembly 48*b* also includes guide rail 136*b* (shown in dotted lines in FIG. 9) positioned at the periphery of slide-core assembly 48*b* and abutting slide assembly 56*b* and core block 52*b*. Guide rail 136*b* includes cam track 140*b* on its inner side, within which cam follower 132*b* is slideably disposed. Cam track 140*b* includes a substantially straight portion 144*b* and a trough 148*b*. Straight portion 144*b* and trough 148*b* collectively form a profile that defines the path through which cam follower 132*b* can travel, thereby defining the path of movement of exercising member 64*b* as slide-core assembly 48*b* moves from the molding position to the ejection position.

Still further, slide-core assembly 48*b* also includes side cores 72*b*, wherein the angle α of the face of each side core 72*b* that defines each lid 28*b* during formation, is set at about ninety degrees; in contrast to slide-core assembly 48 wherein in the face of each side core 72 that defines each lid 28 during formation, is set at an acute angle.

In FIG. 9, slide-core assembly 48*b* is shown in the molding position, with containers 20*b* having been formed and the cavity plate (not shown) retracted away from slide core-assembly 48*b*. Thus the molding position in FIG. 9 is analogous to the molding position in FIGS. 4 and 6, except that in FIG. 4, cavity plate assembly 92 is still shown in engagement with slide-core assembly 48.

In operation, and still referring to FIG. 9, slide-core assembly 48*b* operates in a manner similar to slide-core assembly 48 shown in FIGS. 4-8. Once the cavity plate is retracted away from slide-core assembly 48*b*, slide assembly 56*b* is now free to travel distally away from core blocks 52*b*. (The cavity plate is not shown in FIG. 9, but is similar to cavity plate assembly 92 shown in FIG. 4). As slide assembly 56*b* moves distally away from core blocks 52*b*, slide 60*b* moves laterally towards the distal end of the wear plate. (The wear plate is not shown in FIG. 9, but is substantially the same as wear plate 124 shown in FIGS. 4 and 5). At the initial stages of such movement, side cores 72*b* retract from lids 28*b*, thereby leaving lids 28*b* freely standing in an open position at about a ninety degree angle.

A notable difference, however, between the operation of slide-core assemblies 48/48*a* shown in FIGS. 4-8 and slide-core assembly 48*b* shown in FIG. 9, is that connecting rods 68*b* of slide-core assembly 48*b* do not follow the linear movement of slide 60*b* and side cores 72*b* along the plane defined by the wear plate along which slide 60*b* travels. (Again, the wear plate is not shown in FIG. 9, but is substantially the same as wear plate 124 shown in FIGS. 4 and 5). Instead, during movement from the molding position to the ejection position, cam follower 132*b* of connecting rod 68*b*1 moves along the profile of cam track 140*b*, first through straight portion 144*b* and then through trough 148*b*, thereby defining the path of movement of connecting rods 68*b*. Such a path is thus, in places, parallel to the wear plate and in other places, not parallel to the wear plate. While connecting rods 68*b* move along such path, exercising member 64*b* follows accordingly, retracting from the proximal portion of core blocks 52*b*, moving over the first half of containers 20*b*, and approaching lids 28*b*, in the path corresponding to the profile of cam track 140*b*. The profile of cam track 140*b* is thus chosen to effect corresponding profiles of varying force, applied by rollers 84*b*, along the surface of vessel portion 24*b* and/or hinge 32*b* and/or lid 28*b* as rollers 84*b* travel thereover. In the embodiment shown in FIG. 9, trough 148*b* provides a momentary increase in force of rollers 84*b* against lid 28*b* to effect the insertion of the tab into the slot of container closure 20*b*, and thereby snap lid 28*b* into a closed position. (The tab and slot of container closure 20*b* is not shown in FIG. 9, but is substantially the same as tab 36 and slot 40 shown in FIG. 1).

It should now be apparent that the profile of cam track 140*b* can be configured to correspond with any profile for varying an applied force to the formed container closure 20, and/or for avoiding interference with portions thereof, and the like. Such profiles can, in certain circumstances, apply less force in order to avoid, for example, breakage or damage to a particular feature on the surface of the formed container, while in other circumstances, apply greater amounts of force to effect, for example, closure of a lid.

Although not shown in FIG. 9, slide-core assembly 48*b* continues to operate in a manner similar to that of slide-core assemblies 48/48*a* shown in FIGS. 4-8. As slide-core assembly 48*b* continues to move from the molding position to the ejection position and slide assembly 56*b* moves distally away from core block 52*b*, rollers 84*b* engage lids 28*b* and move lids 28*b* such that lids 28*b* pivot about hinge 32*b*. While rollers 84*b* move lids 28*b*, from the open position and into the closed position, live hinges 32*b* are exercised. Rollers 84*b* continue to move lid 28*b* until they engage the periphery of lid 28*b* and depress lids 28*b* until lids 28*b* reach a closed position. During such depression, cam follower 132*b* will pass through trough 148*b*, causing rollers 84*b* to follow and momentarily increase the force applied to lids 28*b* and thereby to effect insertion of the tab into the slot of container closure 20*b*. (Again, the tab and slot of container closure 20*b* is not shown in FIG. 9, but is substantially the same as tab 36 and slot 40 shown in FIG. 1). Next, as slide assembly 56*b* continues to move distally away from core blocks 52*b*, slide-core assembly 48*b* moves into the ejection position where slide 60*b* and side cores 72*b* are now retracted fully, distally away from core blocks 52*b*, and exercising member 64*b* is positioned out of the path of containers 20*b*. Formed containers 20*b* are now free to be ejected from slide-core assembly 48*b*.

While only specific configurations and combinations of the various features and components of the present invention have been discussed herein, it will be apparent to those of skill in the art that desired subsets of the disclosed features and components and/or alternative combinations and configurations of these features and components can be utilized as desired. For example, it is to be understood that the molded article of the present invention can be in any desired size or shape, and includes molded articles having at least one live hinge formed integrally between a first portion (e.g. vessel) and a second portion (e.g. lid). Furthermore, it is to be understood that the live hinge of the molded article can be positioned at any desired location on a surface of the molded article. For example, in certain embodiments the live hinge can be positioned at or near the periphery of a surface of the molded article, and in other embodiments the live hinge can be positioned at or near the center of the top surface of the article. It is also contemplated that the tab and complementary slot of the molded article can be of any desired size or shape. Further, in other embodiments the molded articles need not include tabs or slots.

Furthermore, it is to be understood that the core plate assembly of the present invention can include any desired number of slide-core assemblies for forming molded articles and exercising live hinges respective to each article, within practical or other design limitations of the overall form factor of the injection molding mold.

By the same token, it is to be understood that the slide-core assembly of the present invention can include any number of core blocks and slide assemblies. In addition, the slide assemblies of the present invention can include any number of connecting rods, rollers and side cores. For example, in certain embodiments there is more than one side core between each pair of connecting rods.

Further, the side cores can be attached to the slide by any desired type of fastener, such as by bolt, screw, clip, latch, weld, or solder.

In addition, the rollers can be rotatably attached to the roller shaft, and/or the roller shaft can be rotatably attached to the connecting rod. Further, other embodiments with non-rotatable rollers and/or non-rotatable roller shafts are also within the scope of the invention. For example, the rotatable rollers can be substituted for a non-rotatable pad coated with felt (or other material with similar properties) that brushes over the surface of the molded article.

Furthermore, it is to be understood that the side cores of the present invention can be in any desired size, shape or form. For example, in the embodiments discussed above, lid 28 is set at an acute angle α of less than about ninety degrees in the open position upon formation. Angle α corresponds to the angle of the face of each side core that defines each lid during formation, as indicated in FIGS. 4 and 5. However, in other embodiments, angle α can be set to any desired angle to correspond to the features of the article being formed. While not required, it is presently preferred that angle α be greater than about zero degrees, but less than or equal to one-hundred-and-eighty degrees. (Where angle α is equal to about one-hundred-and-eighty degrees, then an ejector can be used to allow a roller to catch the lid to urge the lid to the closed position during travel of the slide-core assembly. Alternatively, the exercising member can include some sort of "scoop" to initially drag the lid out of the one-hundred-and-eighty degree orientation so the roller can catch the lid to urge the lid to the closed position during travel of the slide-core assembly.) It is more presently preferred that angle α can be from about ten degrees to about ninety degrees, and still more presently preferred to be from about twenty degrees to about eighty degrees.

Furthermore, it is to be understood that the guide rail can include a cam track of any desired profile. As such, the path of movement of the cam follower, and thereby the exercising member, can be set to any desired path as defined by the profile of the cam track. For example, the profile of the cam track can include one or more substantially straight portions, troughs, ramps and/or ridges, of any desired size, shape and/or depth. In addition, other embodiments can include a cam track with a substantially straight profile having no troughs. The profile of the cam track, and thereby the path of movement of the exercising member, is chosen to effect corresponding profiles of varying force, or obstacle avoidance. For example, the profile can be chosen to provide a momentary increase in force for the exercising member to securely close the lid of the molded article; a momentary decrease in force for the exercising member to avoid damaging a more fragile portion of the article; or a momentary clearance for the exercising member to avoid an obstacle on the molded article.

Furthermore, it is to be understood that certain embodiments of the slide-core assembly of the present invention can include a spring disposed within the slide or the side core to engage the connecting rod and thereby exert a force against the connecting rod to bias the connecting rod, preferably in a downward direction.

Furthermore, it is to be understood that the exercising member of the present invention can be set at any desired configuration. For example, the angle of engagement and height of the rollers above the surface of each core block can be adjusted so that as the rollers engage the lids, each lid is latched securely into the closed position without being crushed.

Furthermore, it is to be understood that the slide-core assembly of the present invention can be used for other functions in addition to exercising live hinges during formation of the molded article. For example, it is contemplated that the exercising member can be exchanged for (or used in conjunction with one or more of) a cutting member, a printing member, or a labeller for applying labels to surface of the molded article. Other types of side-core followers (for changing an article molded using a side-core), in addition to, or in lieu of the exercising member will now occur to those of skill in the art.

The above described embodiments of the invention are intended to be examples of the present invention and alterations and modifications can be effected thereto, by those of skill in the art, without departing from the scope of the invention which is defined solely by the claims appended hereto.

The invention claimed is:

1. A slide assembly comprising:
   a slide laterally moveable in relation to a first core portion between a molding position and an ejection position;
   a second core portion attached to said slide; said first and second core portions cooperative with complementary cavity portions in said molding position to form respective first and second parts of an article having a live hinge integrally formed between said parts; and,
   an exercising member movably connected to said slide; said exercising member for moving said second part to exercise said hinge while said slide moves from said molding position into said ejection position.

2. The assembly according to claim 1 wherein said article is a container, said first part is a vessel portion and said second part is a lid.

3. The assembly according to claim 1 wherein said second part is positioned about a periphery of said article.

4. The assembly according to claim 1 wherein said second part is positioned away from a periphery of said article.

5. The assembly according to claim 2 wherein said first core portion comprises an inner core within said first core portion, said inner core for molding said first part such that said first part is hollow.

6. The assembly according to claim 1 wherein said first core portion comprises at least one ejector pin extendable from a retracted position to an extended position for ejecting said article from said first core portion when said slide is in said ejection position.

7. The assembly according to claim 1 wherein said second core portion is bolted to said slide.

8. The assembly according to claim 1 wherein said second core portion includes a molding surface upon which said second part is molded in said molding position in cooperation with a molding surface disposed on said cavity portions.

9. The assembly of claim 8 wherein said molding surfaces are configured for molding said hinge at an angle greater than about zero degrees and less or equal to than about one-hundred-and-eighty degrees.

10. The assembly of claim 8 wherein said face is configured for molding said hinge at an angle greater than or equal to about ten degrees and less than or equal to about ninety degrees.

11. The assembly of claim 8 wherein said face is configured for molding said hinge at an angle greater than or equal to about twenty degrees and less than or equal to about eighty degrees.

12. The assembly according to claim 1 wherein said exercising member is attached to said slide or said second core portion via at least one connecting rod.

13. The assembly according to claim 1 wherein said exercising member is attached to said slide via at least two connecting rods and said exercising member comprises a roller shaft disposed between said connecting rods.

14. The assembly according to claims 10, 12 or 13 wherein said roller shaft comprises at least one roller for engaging with said second part in order to exercise said hinge.

15. The assembly according to claims 10, 12 or 13 wherein said roller shaft comprises a pad for engaging with said second part in order to exercise said hinge.

16. The assembly according to claim 14 wherein said roller shaft is rotatably attached to said connecting rods.

17. The assembly according to claim 14 wherein said at least one roller is rotatable about said roller shaft.

18. The assembly according to claim 1 wherein said connecting rod is pivotable in a direction transverse to the movement from said molding position to said ejection position.

19. The assembly according to claim 18 further comprising a guide for defining a path of travel for said exercising member during the movement from said molding position to said ejection position.

20. The assembly of claim 19 wherein said guide includes a guide rail adjacent to one of said connecting rods that is fixed in relation to the movement from said molding position to said ejection position; said guide rail including a cam track for defining said path; said at least one of said connecting rods including a cam follower slidable within said cam track.

21. The assembly according to claim 20 wherein said cam track comprises at least one of a straight portion, a trough, a ridge, and a ramp portion.

22. The assembly according to claim 18 wherein at least one of said slide and said second core portion comprises a biasing means for urging said connecting rod towards said first core portion.

23. The assembly according to claim 18 wherein said connecting rod is adjustable such that said exercising member engages said second portion with correspondingly adjustable force.

24. A mold for molding an article having a first part and a second part and a live hinge integrally formed therebetween, said mold comprising:
   a first core portion;
   a slide laterally moveable in relation to said first core portion between a molding position and an ejection position;
   a second core portion movably connected to said slide; a cavity block having an injection nozzle receptacle; said cavity block movable to engage said injection nozzle receptacle with said core portions in said molding position for an injection of a material into a space defined between said core portions and cavity block to form said article within said space; said cavity block movable away from said assembly after said injection and prior to said slide moving into said ejection position; and,
   an exercising member movably connected to said slide; said exercising member for moving said second part to exercise said hinge while said slide moves from said molding position into said ejection position.

* * * * *